United States Patent
Selig

(10) Patent No.: US 9,197,439 B2
(45) Date of Patent: Nov. 24, 2015

(54) FIELD BUS NETWORK HAVING TWO MAIN USERS AND AT LEAST ONE DEPENDENT USER

(71) Applicant: Robert Bosch GmbH, Stuttgart (DE)

(72) Inventor: Andreas Selig, Lohr-Sendelbach (DE)

(73) Assignee: Robert Bosch GmbH, Stuttgart (DE)

(*) Notice: Subject to any disclaimer, the term of this patent is extended or adjusted under 35 U.S.C. 154(b) by 370 days.

(21) Appl. No.: 13/906,192

(22) Filed: May 30, 2013

(65) Prior Publication Data
US 2013/0325996 A1    Dec. 5, 2013

(30) Foreign Application Priority Data
May 31, 2012 (DE) .................. 10 2012 010 851

(51) Int. Cl.
H04L 12/42 (2006.01)
H04L 12/40 (2006.01)
H04L 12/433 (2006.01)
H04L 12/437 (2006.01)

(52) U.S. Cl.
CPC .......... *H04L 12/40019* (2013.01); *H04L 12/42* (2013.01); *H04L 12/433* (2013.01); *H04L 12/437* (2013.01); *H04L 2012/40208* (2013.01)

(58) Field of Classification Search
CPC ..... H04L 12/437; H04L 12/42; H04L 12/433; H04L 12/40019; H04L 2012/40208
See application file for complete search history.

(56) References Cited

U.S. PATENT DOCUMENTS

| | | | |
|---|---|---|---|
| 2005/0114577 A1* | 5/2005 | Beckhoff et al. | 710/110 |
| 2007/0147232 A1* | 6/2007 | Takehara et al. | 370/217 |
| 2008/0082178 A1* | 4/2008 | Schroff et al. | 700/3 |
| 2008/0170495 A1* | 7/2008 | Monse et al. | 370/223 |
| 2011/0093098 A1* | 4/2011 | Kostadinov et al. | 700/87 |
| 2012/0165980 A1* | 6/2012 | Kim | 700/254 |
| 2013/0094352 A1* | 4/2013 | Bouhal et al. | 370/225 |
| 2013/0121346 A1* | 5/2013 | Mitchell et al. | 370/465 |

FOREIGN PATENT DOCUMENTS

| | | |
|---|---|---|
| DE | 10 2004 041 093 A1 | 3/2006 |
| EP | 1 657 619 A2 | 5/2006 |
| EP | 1 659 467 A1 | 5/2006 |
| EP | 2 282 452 A1 | 2/2011 |

OTHER PUBLICATIONS

Sercos III Interface; Sercos III Technical Introduction; Sercos Seminar, Atlanta, Sep. 16, 2009; 50 pages.

* cited by examiner

*Primary Examiner* — Le H Luu
(74) *Attorney, Agent, or Firm* — Maginot, Moore & Beck LLP

(57) ABSTRACT

The disclosure relates to a field bus network having two masters and at least one slave which are connected to one another in a dual ring comprising a first ring and a second ring and each of the two masters being configured for generator data packets and sending out a generated data packet on each of the rings at regular time intervals. The at least one slave being configured for receiving a data packet at an input and forwarding it at an output. Each of the two masters being configured for receiving a data packet coming from the other master in each case at an input and forwarding it at an output.

13 Claims, 1 Drawing Sheet

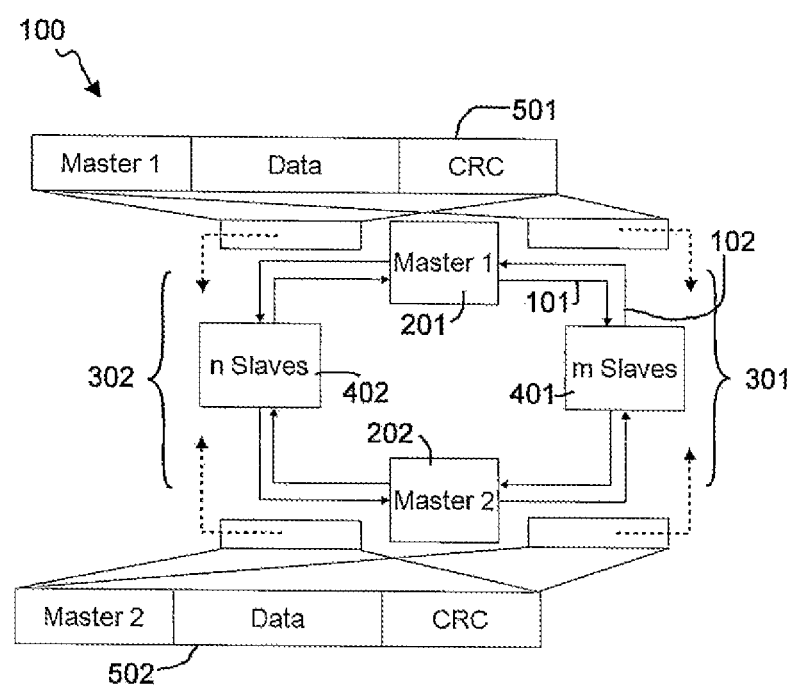

FIELD BUS NETWORK HAVING TWO MAIN USERS AND AT LEAST ONE DEPENDENT USER

This application claims priority under 35 U.S.C. §119 to patent application no. DE 10 2012 010 851.6, filed on May 31, 2012 in Germany, the disclosure of which is incorporated herein by reference in its entirety.

BACKGROUND

The present disclosure relates to a field bus network having two main users and at least one dependent user.

The disclosure lies in the field of real-time-capable redundant field bus networks having a ring topology such as e.g., SERCOS III. These are industrial networks which are used for networking industrial machines and are often based on Ethernet. Real-time-capable means that transmitted data reach or have reached the desired user at a definable time. In particular, it should be emphasized that conventional Ethernet networks, even if they are used for audio or video transmissions, are not real-time-capable since buffers are used here in order to compensate for data transmission delays or delayed or failed packets are simply discarded. In real-time-capable networks, in contrast, it can be guaranteed that each packet also reaches its target in time so that, especially in industrial machines, movements of different units also proceed synchronously. In particular, communication proceeds in fixed cycles, one packet being sent around by the main user in each cycle.

DE 10 2004 041 093 A1 describes such an annular network which, for example, could represent a control and drive system for industrial machines such as, e.g., shaftless introduction machines (i.e. without mechanical "shaft-type" coupling of the units). Such systems use an so-called contra rotating dual ring for the communication, between a main user (so-called "master", e.g. an SPS) which controls the communication, and dependent users (so called "slaves" e.g. actuators and sensors) which receive commands and/or deliver data (especially measurement and diagnostic data) back to the master.

As described in EP 1 659 467 A1, it can be provided for reasons of redundancy that the dual ring breaks into two single rings in the case of a fault (e.g. in the case of a line interruption), between which the master is located. Communication between the master and all slaves can thus continue.

It is desirable to be able to continue to operate such a field bus network even in the case of a failure of a master.

SUMMARY

According to the disclosure, a field bus network having two masters and at least one slave having the features described herein is proposed. Advantageous embodiments are the subject matter of the following description.

The disclosure creates a redundancy of masters in the field bus networks which are actually designed only for a single master in the ring, with simple means. The essential measure consists in providing two masters instead of one in the field bus network and configuring the two masters correspondingly so that they do not mutually interfere in the undisturbed operation and, at the same time, monitor each other. For this purpose, only the masters need to be reconfigured, whereas the cabling and also the slaves can be kept unchanged. The disclosure creates an option to be able to continue to operate such a field bus network even in the case of the failure of a master or in the case of a dual network break (as long as there is a master in each remaining network segment).

In the field bus network according to the disclosure, a first master is connected to a second master via two ring segments which preferably contain in each case at least one slave. A ring segment again contains a branch of a dual ring. Both masters are configured for performing the same communication with the slaves, for example, the same drive program runs on both masters for an industrial machine, the actuators of which (switches, relays, electric motors etc.) and sensors (for position, temperature, voltage, current, pressure etc.) are the slaves.

Each of the masters is configured for generating data packets and sending out a data packet cyclically (i.e. at regular time intervals) onto each ring. The two data packets sent out per cycle by a master (i.e. one on each ring) are suitably identical and are suitably also sent out simultaneously. Each data packet comprises master-specific data (e.g. "sender addresses" such as MAC addresses) and slave-specific data (e.g. nominal values or other process data). A checksum can also be contained. In this manner, the redundancy for dual rings known in the prior art is advantageously retained.

Data packets of different masters differ in the same transmission cycle preferably only due to master-specific data, the slave-specific data being identical. If there are checksums which include the different master-specific data, the checksums are also naturally different. By this means, it is possible to cope with a failure of a master in a very simple manner.

The field bus network is configured in such a manner that the data packets run from user to user and lastly reach the sending master again in the undisturbed case. Along the path, nominal values or other process data are possibly conveyed to the slaves and/or data are possibly written into the data packet by the slaves. This type of transmission is normally used especially in SERCOS III networks to which reference is made with regard to greater details.

As a consequence, each data packet which is sent by the first master passes the second master in the undisturbed case and each data packet which is sent by the second master passes the first master as a result of which mutual monitoring can be implemented in a simple manner. If a master determines that only one or no data packet of another master arrives in one transmission cycle, it can be determined that a ring or that both rings or the other master are damaged.

If one of the masters is no longer present, the other master automatically takes over the tasks of the other one without any time offset, since the slave-specific data necessary for this are of course present. If, for example, all data packets of a master fail, the data packets of the other master still reach the slaves. If a master recognizes that the other one is no longer present or is no longer behaving correctly, ongoing measures such as the switching-off of the other master can be initiated by it.

Each slave can be suitably configured for taking into consideration only process data of the first data packet received which reaches it in one transmission cycle.

The first and the second master in each case have preferably a timing means which are time-synchronized. An option for a clock time synchronization is described in EP 1 657 619 A2. This enables the masters to match their transmission cycles so that both masters essentially send out their data packets simultaneously.

Further advantages and embodiments of the disclosure are obtained from the description and the attached drawing.

Naturally, the aforementioned features and those still to be explained in the text which follows can be used not only in the combinations specified in each case but also in other combinations or by themselves without departing from the context of the present disclosure.

The disclosure is represented diagrammatically by means of an exemplary embodiment in the drawing and will be described in detail with reference to the drawing in the text which follows.

BRIEF DESCRIPTION OF THE DRAWINGS

The FIGURE shows a preferred embodiment of a field bus network according to the disclosure.

DETAILED DESCRIPTION

In the FIGURE, a preferred embodiment of a field bus network according to the disclosure is shown diagrammatically as block diagram and designated overall by 100. The field bus network 100 is a real-time-capable redundant field bus network having a ring topology such as, e.g., SERCOS III. The field bus network has here a so-called contra rotating dual ring. Contra rotating means that the data packets circulate clockwise on a first ring 101 and anticlockwise on a second ring 102.

The field bus network 100 has a first master 201, designated by "Master 1", and a second master 202, designated by "Master 2". The field bus network 100 also has a first ring segment 301 and a second ring segment 302 by means of which the two masters 201 and 202 are connected.

The first ring segment 301 has here the branches, on the right-hand side in the FIGURE, of the rings 101 and 102 and a number m of dependant users 401 designated as "m slaves". The second ring segment 302 has here branches, on the left-hand side in the FIGURE, of rings 101 and 102 and a number of dependant users 402 designated as "n slaves".

The first master 201 is configured for sending out data packets 501 cyclically (i.e. at regular time intervals) both on the first ring 101 and on the second ring 102, which are identical in each transmission cycle, but not for different transmission cycles. Each data packet 501 has master-specific data which are designated as "Master 1", slave-specific data which are designated as "data", and a checksum which is designated by "CRC".

Correspondingly, the second master 202 is configured for sending out data packets 502 cyclically and simultaneously with the first master 201 both on the first ring 101 and on the second ring 102 which are also identical in each transmission cycle but not for different transmission cycles. Each data packet 502 has master-specific data which are designated as "Master 2", slave-specific data which are designated as "data" and a checksum which is designated by "CRC".

The master-specific data of the data packets 501 and 502 differ in one and the same transmission cycle. The slave-specific data in the data packets 501 and 502 are identical in one and the same transmission cycle.

As is known, e.g., in the prior art for SERCOS III networks, the slaves 401, 402 are configured for processing and forwarding the received data packets 501, 502. Since the slave-specific data in the data packets 501, 502 of one transmission cycle are identical, the slaves can be operated in familiar manner.

A failure of a master is detected by the other master due to the fact that the data packets of this failed master no longer reach the remaining master. The operation of the field bus network 100 can be continued without interference in this case since the slave-specific data relevant to the operation are also delivered by the remaining master.

The first ring 101 and the second ring 102 can be implemented, for example, by means of a line- or radio-connected data transmission which allows bidirectional communication. Each user (master and slave) has interfaces for data transmission, e.g. sockets for Ethernet cable connections and/or antennas. Since this is an annular redundant system, each user logically has four connections (in each case two inputs (arrow points in the FIGURE) and two outputs (arrow ends in the FIGURE).

What is claimed is:

1. A field bus network comprising:
   two masters; and
   at least one slave, the two masters and the at least one slave being connected to one another in a dual ring including a first ring and a second ring, wherein each master of the two masters is configured (i) to generate data packets, and (ii) to send out one of the generated data packets at regular time intervals on each of the first ring and the second ring,
   wherein the at least one slave is configured (i) to receive a first sent data packet of the generated data packets at a first input, and (ii) to forward the first sent data packet at a first output, and
   wherein each master of the two masters is further configured (i) to receive a second sent data packet coming from the other master in each case at a second input, and (ii) to forward the second sent data packet at a second output.

2. The field bus network according to claim 1, wherein:
   each master of the two masters is configured to generate the generated data packets by using master-specific data, and
   the master-specific data of the first master is different from the master-specific data of the second master.

3. The field bus network according to claim 1, wherein:
   each master of the two masters is configured to generate the generated data packets by using slave-specific data, and
   the slave-specific data of the first master and the slave-specific data of the second master is identical for one and the same transmission time.

4. The field bus network according to claim 1, wherein a first master of the two masters is configured to detect a disturbance of a connection with a second master of the two masters in each case when the first master fails to receive at a master input a first generated data packet of the generated data packets coming from the second master in each case at regular time intervals.

5. The field bus network according to claim 1, wherein each master of the two masters is configured to send out the one of the generated data packets simultaneously onto each of the rings.

6. The field bus network according to claim 5, wherein the generated data packets sent out simultaneously by the two masters are identical.

7. The field bus network according to claim 5, where a first master of the two masters is configured to send out generated data packets at the same time as a second master of the two masters.

8. The field bus network according to claim 1, wherein the field bus network is configured to perform a clock time synchronization between the two masters.

9. The field bus network according to claim 1, wherein the first ring and the second ring are configured as an Ethernet link.

10. The field bus network according to claim 1, wherein the field bus network is configured as a SERCOS III network.

11. An industrial machine comprising:
    at least one device; and a field bus network including two masters and at least one slave, wherein the two masters and the at least one slave are connected to one another in a dual ring including a first ring and a second ring, wherein each master of the two masters is configured (i) to generate data packets, and (ii) to send out one of the generated data packets at regular time intervals on each of the first ring and the second ring, wherein the at least one slave is configured (i) to receive a first sent data packet of the generated data packets at a first input, and (ii) to forward the first sent data packet at a first output, wherein each master of the two masters is further configured (i) to receive a second sent data packet coming from the other master in each case at a second input, and (ii) to forward the second sent data packet at a second output, wherein the at least one device includes at least one of a sensor and an actuator, and wherein the at least one device includes the at least one slave of the field bus network.

12. The industrial machine according to claim 11, wherein the industrial machine is configured as printing machine, an industrial robot, a machine tool, or a CNC machine.

13. The industrial machine according to claim 11, wherein the at least one device includes an electric motor.

* * * * *